(12) United States Patent
Takizawa et al.

(10) Patent No.: US 10,900,270 B2
(45) Date of Patent: Jan. 26, 2021

(54) ACTUATOR FOR A VEHICLE-DOOR

(71) Applicant: Mitsuba Corporation, Gunma (JP)

(72) Inventors: Takashi Takizawa, Kiryu (JP);
Takayuki Ikeda, Kiryu (JP); Yoshitaka Sekine, Kiryu (JP); Masazumi Ishikawa, Kiryu (JP); Hiroshi Matsuzaki, Kiryu (JP); Arata Taniguchi, Kiryu (JP)

(73) Assignee: Mitsuba Corporation, Gunma (JP)

( * ) Notice: Subject to any disclaimer, the term of this patent is extended or adjusted under 35 U.S.C. 154(b) by 277 days.

(21) Appl. No.: 15/747,288

(22) PCT Filed: Jul. 27, 2016

(86) PCT No.: PCT/JP2016/071961
§ 371 (c)(1),
(2) Date: Jan. 24, 2018

(87) PCT Pub. No.: WO2017/022581
PCT Pub. Date: Feb. 9, 2017

(65) Prior Publication Data
US 2018/0216391 A1 Aug. 2, 2018

(30) Foreign Application Priority Data

Jul. 31, 2015 (JP) .................................. 2015-151722

(51) Int. Cl.
*E05F 15/622* (2015.01)
*F16F 15/08* (2006.01)
(Continued)

(52) U.S. Cl.
CPC ............... *E05F 15/622* (2015.01); *B60J 5/10* (2013.01); *B60J 5/101* (2013.01); *F16D 3/50* (2013.01);
(Continued)

(58) Field of Classification Search
CPC ... E05F 15/622; F16H 2025/2087; B60J 5/10; B60J 5/101
See application file for complete search history.

(56) References Cited

U.S. PATENT DOCUMENTS

2008/0072695 A1 3/2008 Hudson et al.
2014/0000394 A1* 1/2014 Anheier .................. F16H 25/20
74/89.29
(Continued)

FOREIGN PATENT DOCUMENTS

DE 102011082540 A1 3/2013
JP 58053857 U 4/1983
(Continued)

OTHER PUBLICATIONS

European Patent Office, Search Report issued in corresponding EP 16832860.7 dated Jun. 11, 2019, 7 pages.
(Continued)

*Primary Examiner* — Gregory J Strimbu
(74) *Attorney, Agent, or Firm* — Wood Herron & Evans LLP

(57) ABSTRACT

A tubular housing, a motor part that is provided in the housing, and an end damper and a damper member, one of each is provided on opposing ends of the motor part in an axial direction of the motor part and absorbs vibration, wherein the motor part is supported in a floating state by the housing via the end damper and the damper member.

5 Claims, 9 Drawing Sheets

(51) Int. Cl.
  *F16D 3/50* (2006.01)
  *B60J 5/10* (2006.01)
  *F16H 25/20* (2006.01)

(52) U.S. Cl.
  CPC .............. *F16F 15/08* (2013.01); *F16H 25/20* (2013.01); *F16H 25/2056* (2013.01); *E05Y 2201/70* (2013.01); *E05Y 2201/702* (2013.01); *E05Y 2201/72* (2013.01); *E05Y 2201/726* (2013.01); *E05Y 2600/634* (2013.01); *E05Y 2800/422* (2013.01); *E05Y 2900/546* (2013.01); *F16H 2025/2031* (2013.01); *F16H 2025/2075* (2013.01); *F16H 2025/2087* (2013.01)

(56) References Cited

U.S. PATENT DOCUMENTS

| | | | | |
|---|---|---|---|---|
| 2014/0224045 | A1* | 8/2014 | Kummer | E05F 15/622 74/60 |
| 2015/0040698 | A1* | 2/2015 | Kessler | H02K 1/17 74/89 |
| 2017/0145727 | A1* | 5/2017 | Yamagata | F16H 25/2454 |
| 2017/0362876 | A1* | 12/2017 | Ishikawa | H02K 5/10 |
| 2018/0216390 | A1* | 8/2018 | Takizawa | F16H 1/46 |
| 2019/0277076 | A1* | 9/2019 | Takizawa | F16J 15/102 |

FOREIGN PATENT DOCUMENTS

| | | |
|---|---|---|
| JP | 2000027922 A | 1/2000 |
| JP | 2014100956 A | 6/2014 |
| JP | 2014523497 A | 9/2014 |

OTHER PUBLICATIONS

PCT Office, International Search Report issued in PCT/JP2016/071961 dated Sep. 6, 2016, 2 pages.
PCT Office, International Preliminary Report on Patentability issued in PCT/JP2016/071961 dated Aug. 22, 2017, 8 pages.
Chinese Patent Office, Notice of Allowance issued in CN 201680044036.7 dated Feb. 27, 2020, 8 pages.

* cited by examiner

ACTUATOR FOR A VEHICLE-DOOR

TECHNICAL FIELD

The present invention relates to an actuator, for example, used to open/close a door such as a tailgate or the like of an automobile and a vehicle-door opening/closing actuator.

Priority is claimed on Japanese Patent Application No. 2015-151722 filed on Jul. 31, 2015, the contents of which are incorporated herein by reference.

BACKGROUND

In the related art, as a vehicle door opening/closing apparatus, a configuration is known including an actuator (a support member) which is telescopically driven in an axial direction between a periphery of an opening of a vehicle body and a tailgate (a rear door) that is provided at the opening so as to be openable/closable and which thereby opens/closes the tailgate (for example, refer to Patent Document 1).

Such an actuator includes a tubular first housing, a second housing which has a larger diameter than the first housing and in which the first housing is inserted, a motor that is provided inside the first housing, a screw spindle that is coupled to the motor via a speed reducer and that is arranged coaxially with the motor, a spindle nut that is fixed to the second housing and that is screwed on the screw spindle, and a compression coil spring that is housed in the second housing and that biases the first housing and the second housing in an extension direction. The motor and the speed reducer are separately provided inside the first housing. A bearing for rotatably supporting a rotary shaft of the motor is provided by applying a drawing process on a motor housing. On the other hand, the speed reducer is rotatably supported by the rotary shaft of the motor and the screw spindle.

In such a configuration, when the actuator drives and rotates the motor, the rotation of an output shaft of the motor is transmitted to the screw spindle via the speed reducer, and the screw spindle is rotated. The spindle nut that is screwed on the screw spindle moves in an axial direction of the screw spindle by the rotation of the screw spindle. Thereby, the second housing is projected/retracted with respect to the first housing, and the actuator is expanded/shrunk.

RELATED ART DOCUMENTS

Patent Documents

[Patent Document 1] Japanese Unexamined Patent Application, First Publication No. 2014-100956

SUMMARY OF INVENTION

Problems to be Solved by the Invention

In the actuator described above, there is a problem that when the actuator is operated and the motor is rotated, vibration and noise may occur at an engaged part between the motor and the speed reducer, an engaged part in the speed reducer, an engaged part between the speed reducer and the screw spindle, and the like.

The present invention provides an actuator and a vehicle-door opening/closing actuator capable of reducing vibration and noise while being operated.

Means for Solving the Problem

According to a first aspect of the present invention, an actuator includes a tubular first housing that is attached to an attached body, a motor that is provided in the first housing, and first and second damper members, one of which is provided on each of both ends in an axial direction of the motor and absorbs vibration, wherein the motor is supported in a floating state by the first housing via the first damper member and the second damper member.

According to such a configuration, it is possible to prevent vibration of the motor from being transmitted to the first housing. Therefore, it is possible to reduce vibration and noise while the actuator is operated.

According to a second aspect of the present invention, the actuator according to the first aspect of the present invention further includes a tubular second housing that is provided so as to be capable of being projected/retracted with respect to the first housing, a drive shaft that is driven and rotated by a rotary shaft of the motor, a speed reduction gear part that is provided between the rotary shaft of the motor and the drive shaft and that reduces a speed of a rotation of the rotary shaft, a driven member that is fixed to the second housing and that is moved along an axial direction of the drive shaft in accordance with a rotation of the drive shaft to thereby allows the second housing to be projected/retracted with respect to the first housing, and a coil spring that is provided in the first housing and the second housing and that provides a bias force of a direction in which the second housing is protruded with respect to the first housing.

According to such a configuration, it is possible to attenuate vibration and impact between the drive shaft, and the motor and the speed reduction gear part by the first damper member and the second damper member.

According to a third aspect of the present invention, the actuator according to the second aspect of the present invention further includes a bearing holder that is provided on the first housing and that holds a bearing which rotatably supports the drive shaft, wherein the second damper member is provided between the speed reduction gear part and the bearing holder.

According to such a configuration, it is possible to effectively attenuate vibration and impact between the drive shaft, and the motor and the speed reduction gear part by the second damper member.

According to a fourth aspect of the present invention, in the actuator according to the third aspect of the present invention, a first protrusion that protrudes toward the second damper member is formed on the gear case of the speed reduction gear part, a second protrusion that protrudes toward the gear case is formed on the bearing holder, and an insertion part in which the first protrusion and the second protrusion are capable of being inserted is formed on the second damper member.

According to such a configuration, it is possible to absorb a relative displacement in a circumferential direction between the gear case and the bearing holder by the second damper member. Thereby, it is possible to further effectively prevent vibration and impact in a rotation direction while the motor is operated from occurring.

According to a fifth aspect of the present invention, a vehicle-door opening/closing actuator is an actuator in use for opening/closing a vehicle door, in which an actuator according to any one of the second to fourth aspects of the present invention is used in order to open/close a door that is provided to be openable/closable with respect to an opening, wherein the first housing is coupled to any one of the opening and the door, and the second housing is coupled to the other of the opening and the door.

According to such a configuration, it is possible to reduce vibration and noise while being operated in the vehicle-door opening/closing actuator that opens/closes the door provided on the opening.

Advantage of the Invention

According to the actuator and the vehicle-door opening/closing actuator described above, it is possible to prevent vibration of the motor from being transmitted to the first housing. Therefore, it is possible to reduce vibration and noise while the actuator is operated.

DESCRIPTION OF THE EMBODIMENTS

Next, an embodiment of the present invention will be described with reference to the drawings.
(Vehicle-Door Opening/Closing Actuator)

Figure 1:
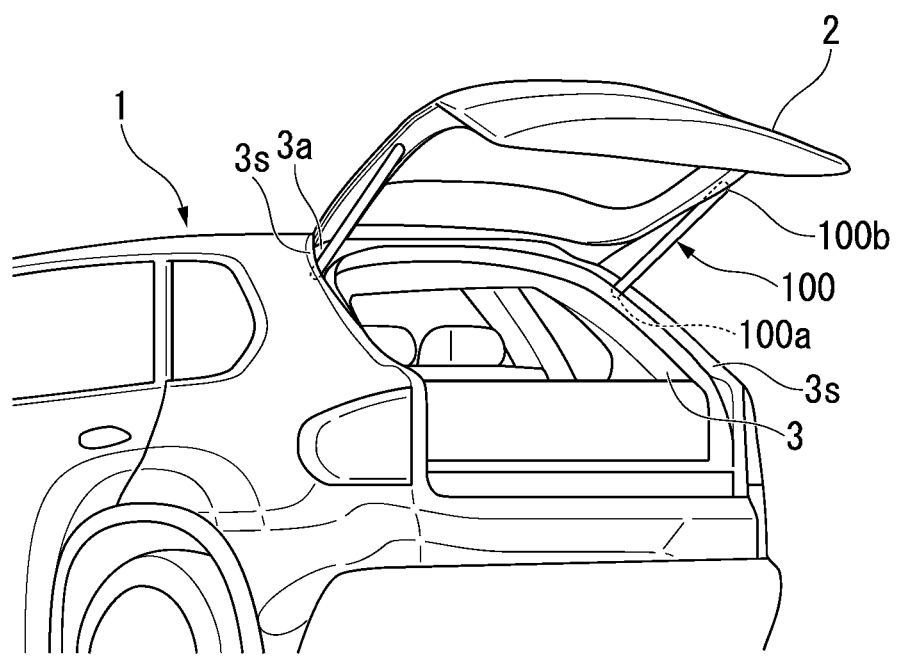
FIG. 1 is a perspective view illustrating an example of a vehicle that includes a vehicle-door opening/closing actuator in an embodiment of the present invention.

FIG. 1 is a perspective view illustrating an example of a vehicle that includes a vehicle-door opening/closing actuator 100 (hereinafter, referred to simply as an actuator 100) in an embodiment of the present invention.

As illustrated in the figure, the actuator 100 opens/closes, for example, a tailgate (a door) 2 of an automobile 1. The tailgate 2 is provided to be openable/closable relative to an opening 3, which is formed on a rear part of a vehicle body of the automobile 1, via a hinge mechanism (not shown) at an upper portion 3a of the opening 3.

The actuator 100 is provided on both right and left sides of the opening 3. One end 100a of the actuator 100 is rotatably coupled to a lateral frame part 3s of the opening 3 via a pin (not shown), and the other end 100b of the actuator 100 is rotatably coupled to the tailgate 2 via a pin (not shown).

Figure 2:
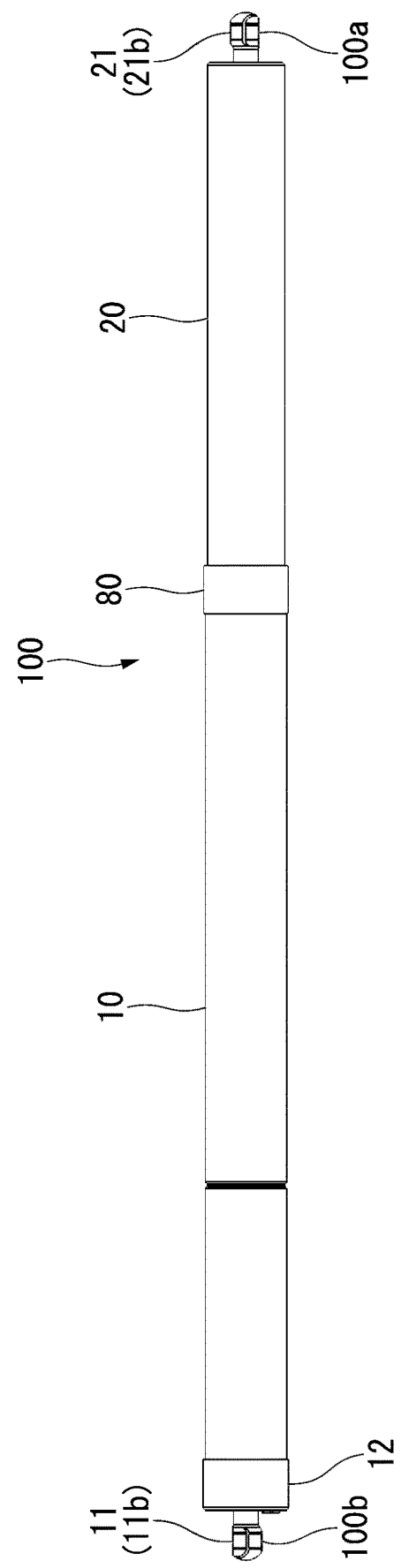
FIG. 2 is a side view illustrating an exterior of the vehicle-door opening/closing actuator in the embodiment of the present invention.
Figure 3:
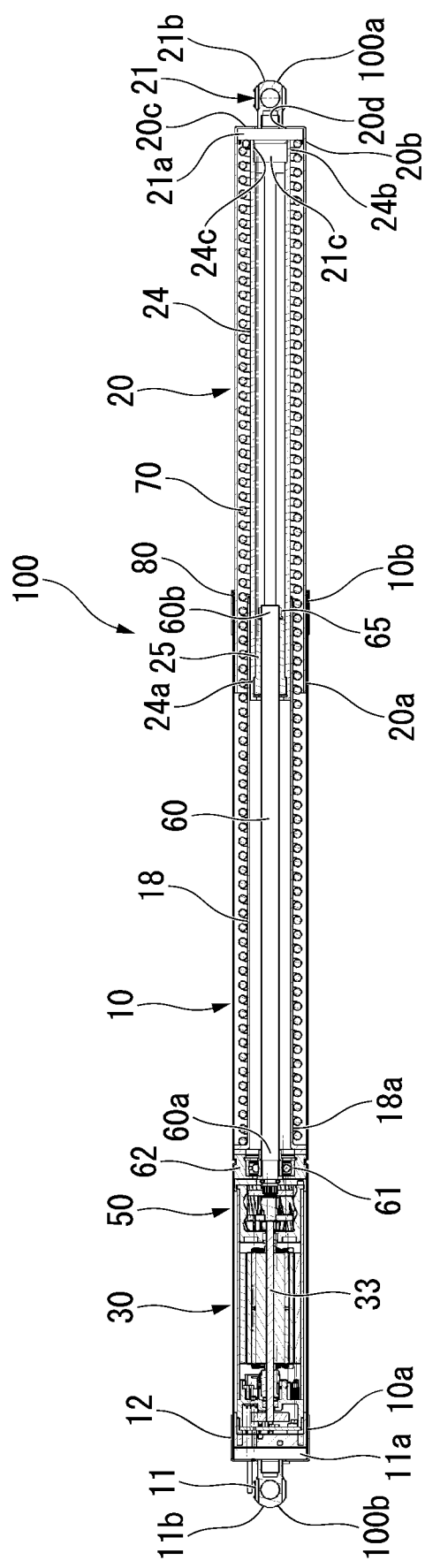
FIG. 3 is a cross-sectional view of the vehicle-door opening/closing actuator in the embodiment of the present invention.
Figure 4:
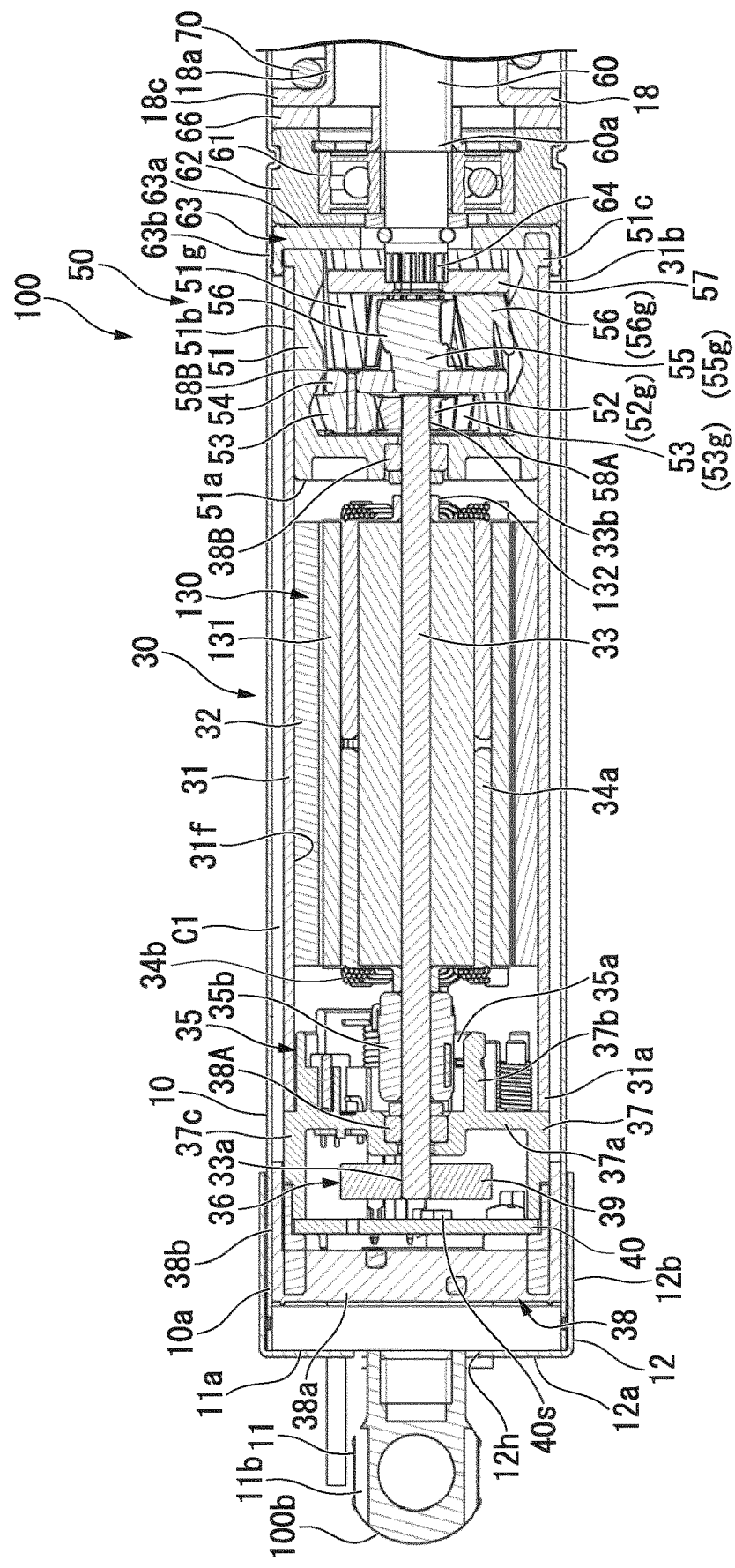
FIG. 4 is an enlarged cross-sectional view illustrating a motor part and a speed reduction gear part in the embodiment of the present invention.

FIG. 2 is a side view illustrating an exterior of the actuator 100. FIG. 3 is a cross-sectional view of the actuator 100. FIG. 4 is an enlarged cross-sectional view illustrating a motor part 30 and a speed reduction gear part 50 of the actuator 100.

As illustrated in FIGS. 2 and 3, the actuator 100 includes a first housing 10, a second housing 20, the motor part 30, the speed reduction gear part 50 that reduces and outputs a rotational force of the motor part 30, a screw shaft 60 that is rotated by the rotational force of the motor part 30 which is transmitted via the speed reduction gear part 50, and a coil spring 70.

The first housing 10 has a cylindrical shape and is formed of a metal material such as iron.

As illustrated in FIG. 4, a joint member 11 that is coupled to the tailgate 2 side via a pin (not shown) is provided on one end 10a (a left end in FIG. 4) of the first housing 10. The joint member 11 includes a plate part 11a that has a disc shape and that is fitted inside the one end 10a of the first housing 10, and a joint part 11b which protrudes from the plate part 11a to the outside of the first housing 10 and to which a pin (not shown) is coupled.

A cap 12 is mounted on the one end 10a of the first housing 10. The cap 12 integrally includes: a discoid blockage part 12a that includes a middle portion having an insertion hole 12h into which the joint part 11b of the joint member 11 is inserted; and a tubular part 12b that continuously extends in a tubular shape from an outer circumferential portion of the blockage part 12a. The one end 10a of the first housing 10 is press-fitted into the tubular part 12b, and thereby, the cap 12 is fixed to the first housing 10.

As illustrated in FIG. 3, the second housing 20 has a cylindrical shape that has an outer diameter which is smaller than an inner diameter of the first housing 10 and is formed of a material, such as a resin, which is softer than the material of the first housing 10. In this way, the weight of the second housing 20 is reduced relative to the weight of the first housing 10.

One end 20a side (a left end side in FIG. 3) of the second housing 20 is inserted into the first housing 10 from the other end 10b side (a right end side in FIG. 3) of the first housing 10. The second housing 20 is movable relative to the first housing 10 in a direction in which the second housing 20 is projected/retracted from the other end 10b.

The other end 20b of the second housing 20 has a bottom 20c formed by a deep drawing process or the like. A through-hole 20d into which a joint part 21b of a joint member 21 (to be described below) can be inserted is formed at the middle of the bottom 20c in a radial direction of the bottom 20c.

The joint member 21 is provided inside the bottom 20c on the other end 20b of the second housing 20. The joint member 21 is a member used for coupling the lateral frame part 3s of the opening 3 of the automobile 1 to the second housing 20. The joint member 21 has a plate part 21a that is fitted inside the other end 20b of the second housing 20 and the joint part 21b that protrudes outward from the plate part 21a via the through-hole 20d that is formed on the bottom 20c. The lateral frame part 3s of the opening 3 is coupled to the joint part 21b via a pin (not shown).

The plate part 21a is arranged so as to face the bottom 20c and is fixed to the other end 20b of the second housing 20 by swaging or the like. An externally threaded part 21c protruding to the inside of the second housing 20 is provided at the middle of the plate part 21a in a radial direction of the plate part 21a. The other end 24b of a cylindrical inner tube 24 is screwed onto this externally threaded part 21c.

The cylindrical inner tube 24 is arranged in the second housing 20. The inner tube 24 is formed of, for example, aluminum by a drawing process. An internally threaded part 24c that is screwed on the externally threaded part 21c of the joint member 21 is provided on the other end 24b of the inner tube 24.

(Motor Part)

Figure 5:
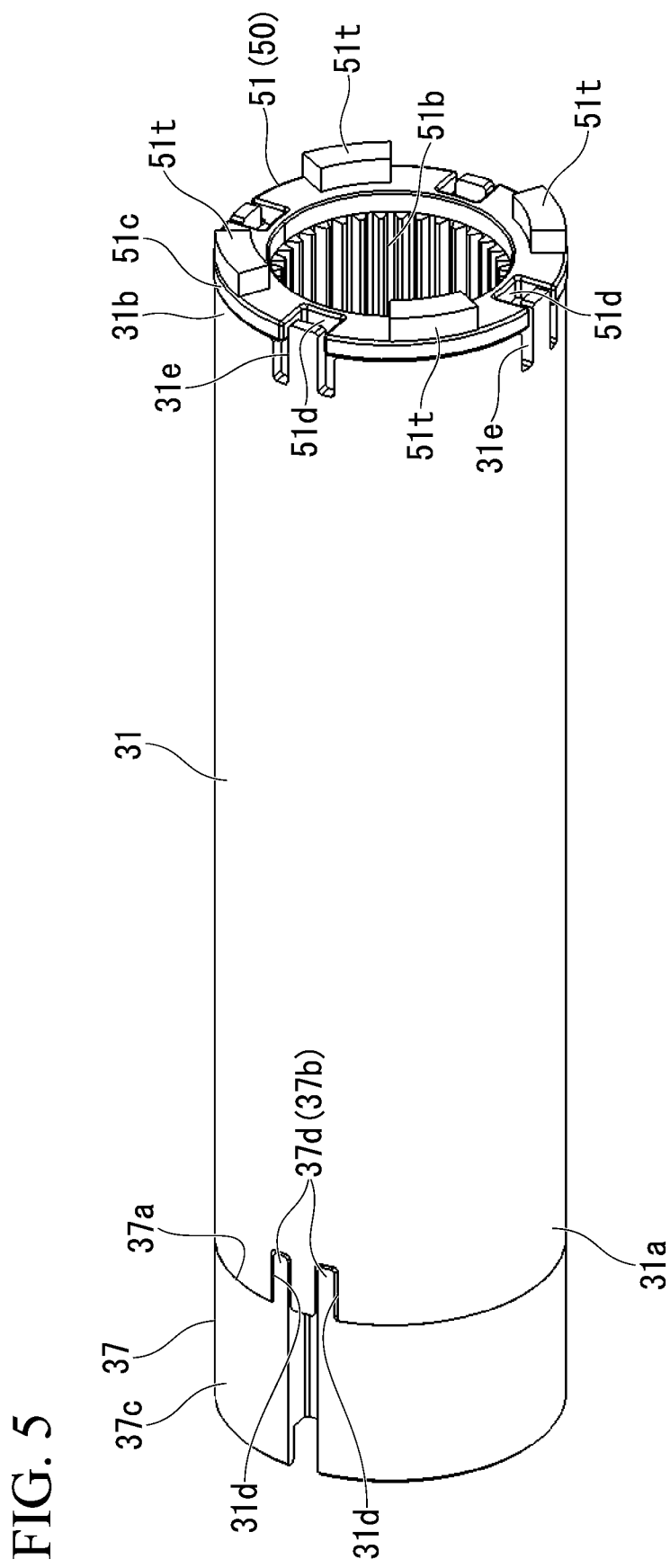
FIG. 5 is a perspective view illustrating a yoke and an internal gear in the embodiment of the present invention.

FIG. 5 is a perspective view illustrating a yoke 31 of the motor part 30 and an internal gear 51 of the speed reduction gear part 50.

As illustrated in FIGS. 4 and 5, the motor part 30 includes a yoke 31, a magnet 32 that is fixed to an inner circumferential surface 31f of the yoke 31, an armature 130 that is rotatably provided on an inner side of the yoke 31 in a radial direction, a power supplying part 35 that supplies a current to the armature 130, and a detecting part 36 that detects a rotation position of the armature 130.

The yoke 31 is made of a metal, has a cylindrical shape, and is arranged in the first housing 10. An outer diameter of the yoke 31 is smaller than the inner diameter of the first housing 10 by a predetermined dimension. A holder member 37 is provided close to one end 31a of the yoke 31. The holder member 37 has a discoid plate part 37a that blocks the one end 31a of the yoke 31, a first tubular part 37b that is inserted into the yoke 31 from the plate part 37a, and a second tubular part 37c that is formed to extend from the plate part 37a toward a side opposite to the first tubular part 37b.

The plate part 37a and the second tubular part 37c have substantially the same outer diameter as the yoke 31. The holder member 37 is mounted by inserting the first tubular part 37b into the yoke 31 and causing the plate part 37a to be butted to the one end 31a (a left end in FIG. 4) of the yoke 31.

As illustrated in FIG. 5, a protrusion 37d extending in an axial direction of the yoke 31 is formed on an outer circumferential surface of the first tubular part 37b. A slit 31d with which the protrusion 37d is engaged is formed on the one end 31a of the yoke 31. The protrusions 37d and the slit 31d are engaged with each other, and thereby, the holder member 37 is provided to be immovable relative to the yoke 31 in a circumferential direction.

As illustrated in FIG. 4, the internal gear (a gear case or a ring gear) 51 constituting the speed reduction gear part 50 (to be described below) is inserted in the other end 31b side (a right end side in FIG. 4) of the yoke 31. The internal gear 51 integrally includes a discoid plate part 51a, a cylindrical tubular part 51b that extends from an outer circumferential portion of the plate part 51a toward the other end 31b of the yoke 31, and a flange part 51c of which the diameter is increased from the tubular part 51b toward an outer circumference at an end on an opposite side of the plate part 51a.

The internal gear 51 is mounted by inserting the tubular part 51b into the yoke 31 such that the plate part 51a is directed toward the one end 31a side of the yoke 31 and causing the flange part 51c to be butted to the other end 13b of the yoke 31.

As illustrated in FIG. 5, a slit 51d is formed on the flange part 51c of the internal gear 51, and a protrusion 31e that is formed so as to extend from the other end 13b of the yoke 31 in an axial direction is engaged with the slit 51d by swaging or the like. The slit 51d and the protrusion 31e are engaged with each other, and thereby, the internal gear 51 is provided to be immovable relative to the yoke 31 in a circumferential direction.

As illustrated in FIG. 4, an end damper 38 is provided between the second tubular part 37c of the holder member 37 and the plate part 11a of the joint member 11. The end damper 38 is formed of a rubber material having elasticity and integrally has a discoid plate part 38a that is interposed between the second tubular part 37c of the holder member 37 and the plate part 11a of the joint member 11 and a tubular part 38b which extends from an outer circumferential portion of the plate part 38a toward the holder member 37 side and into the inside of which the second tubular part 37c is inserted.

The plate part 11a of the joint member 11 and the plate part 38a of the end damper 38 are in a state of being in contact with each other. A convex part (not shown) is formed at any one of the plate parts 11a and 38a, and a concave part (not shown) in which the convex part is fitted is formed at the other. Thereby, the plate parts 11a and 38a do not relatively rotate.

The tubular part 38b of the end damper 38 is interposed between the second tubular part 37c of the holder member 37 and the first housing 10 in the vicinity of the one end 31a of the yoke 31. Thereby, a clearance C1 is formed between the yoke 31 and the first housing 10.

The magnet 32 that is fixed to the inner circumferential surface 31f of the yoke 31 is long in a direction of the central axis of the yoke 31. A plurality of magnets 32 are provided in a circumferential direction of the inner circumferential surface 31f of the yoke 31 at intervals.

The armature 130 that is provided on the inner side of the yoke 31 in the radial direction has a shaft 33, a core 34a that is fixed to the shaft 33, and a coil 34b that is wound around the core 34a.

The shaft 33 is provided so as to extend in the direction of the central axis of the yoke 31. One end 33a of the shaft 33 is supported by an annular bearing 38A that is provided on the middle portion of the plate part 37a of the holder member 37 to freely rotate about the central axis of the shaft 33.

The other end 33b of the shaft 33 is supported by an annular bearing 38B that is provided on the middle portion of the plate part Ma of the internal gear 51 to freely rotate about the central axis of the shaft 33.

The core 34a is integrally provided on an outer circumferential surface of the shaft 33 between the two bearings 38A and 38B. The core 34a has a plurality of teeth 131 that extend radially. The coil 34b is wound around the teeth 131 via an insulator 132 having an insulating property.

The power supplying part 35 that shares a current to the armature 130 constituted in this way is held by the holder member 37. The power supplying part 35 has a brush 35a that is held by the holder member 37 and that supplies power to the coil 34b and a commutator 35b that is provided on the shaft 33 and is slidably in contact with the brush 35a. A wiring (not shown) supplying power from an external power supply is connected to the brush 35a. This wiring (not shown) passes through the plate part 37a of the holder member 37, the end damper 38, and the plate part 11a of the joint member 11 and is led out from the other end 10b (the left end in FIG. 4) of the actuator 100 to the outside. The commutator 35b is electrically connected to the coil 34b.

The detecting part 36 for detecting a rotation position of the armature 130 includes a sensor magnet 39 and a sensor board 40.

The sensor magnet 39 is integrally provided at the one end 33a (the left end in FIG. 4) of the shaft 33 in the vicinity of the second tubular part 37c with respect to the plate part 37a of the holder member 37.

The sensor board 40 has a plate shape and is held in the second tubular part 37c of the holder member 37. When the sensor magnet 39 is rotated along with the shaft 33, a magnetic detector 40s such as a Hall IC which detects the rotation of the sensor magnet 39 is provided on the sensor board 40 at a side opposite to the sensor magnet 39. An output signal line (not shown) outputting a detection signal to the outside in the magnetic detector 40s is connected to the sensor board 40.

When such a motor part 30 conducts a current to the coil 34b through the wiring (not shown) of the power supplying part 35 and the brush 35a, the shaft 33 is driven to rotate about the central axis of the shaft 33 by a magnetic attractive or repulsive force that occurs between a magnetic force that is generated by the coil 34b and a magnetic force that is generated by the magnets 32 which is fixed to the yoke 31.

The rotation of the sensor magnet 39 of the detecting part 36 that is provided integrally with the shaft 33 is detected by the magnetic detector 40s of the sensor board 40, and thereby, the number of rotations of the shaft 33 is detected at the detecting part 36. The rotation of the sensor magnet 39 which is detected by the magnetic detector 40s, that is, the rotation of the shaft 33, is output from the other end 10b of the actuator 100 to the outside via the output signal line (not shown).

(Speed Reduction Gear Part)

The speed reduction gear part 50 is provided at an opposite side of the power supplying part 35 of the motor part 30 constituted in this way. The speed reduction gear part 50 includes the internal gear 51, a first sun gear 52, a first-stage planetary gear 53, a first carrier 54, a second sun gear 55, a second-stage planetary gear 56, and a second carrier 57.

The internal gear 51 that is provided in the other end 31b of the yoke 31 has gear teeth 51g that are formed on the inner circumferential surface of the tubular part 51b.

The first sun gear 52 is fitted into the other end 33b of the shaft 33, and gear teeth 52g are formed on an outer circumferential surface of the first sun gear 52.

For example, three first-stage planetary gears 53 are provided at an outer circumferential portion of the first sun gear 52. Gear teeth 53g that are meshed with the gear teeth 52g of the first sun gear 52 and the gear teeth Mg of the internal gear 51 are formed on an outer circumferential surface of each of the first-stage planetary gears 53.

The first carrier 54 has a disc shape and is arranged on the opposite side of the shaft 33 with respect to the plurality of first-stage planetary gears 53. The first carrier 54 is formed in a disc shape, and a support shaft that rotatably supports the first-stage planetary gear 53 is assembled to the first carrier 54.

The second sun gear 55 is integrally provided on the middle portion of the first carrier 54 on the opposite side of the shaft 33. The second sun gear 55 has gear teeth 55g formed on an outer circumferential surface of the second sun gear 55.

For example, three second-stage planetary gears 56 are provided at an outer circumferential portion of the second sun gear 55. Gear teeth 56g that are meshed with gear teeth 55g of the second sun gear 55 and the gear teeth 51g of the internal gear 51 are formed on an outer circumferential surface of each of the second-stage planetary gears 56.

The second carrier 57 is arranged on the opposite side of the shaft 33 with respect to the plurality of second-stage planetary gears 56. The second carrier 57 is formed in a disc shape, and a support shaft (not shown) that rotatably supports the second-stage planetary gear 56 is assembled to the second carrier 57.

A washer 58A is arranged between the plate part 51a of the internal gear 51 and the first-stage planetary gear 53, and a washer 58B is arranged between the first carrier 54 and the second-stage planetary gear 56.

The first sun gear 52 and the second sun gear 55 are each made of a metal such as a sintering material, and the first carrier 54 and the second carrier 57 are also made of a metal. The internal gear 51, the first-stage planetary gear 53, and the second-stage planetary gear 56 are each made of a resin.

Further, the gear teeth Mg of the internal gear 51, the gear teeth 52g of the first sun gear 52, the gear teeth 53g of the first-stage planetary gear 53, the gear teeth 55g of the second sun gear 55, and the gear teeth 56g of the second-stage planetary gear 56 are each formed as a helical gear. Thereby, a meshing allowance between the gears of the speed reduction gear part 50 can be increased to reduce an operation sound.

A portion at which the gear teeth Mg of the internal gear 51 is meshed with the gear teeth 53g of the first-stage planetary gear 53 and a portion at which the gear teeth Mg of the internal gear 51 is meshed with the gear teeth 56g of the second-stage planetary gear 56 are formed of the gear teeth 51g having the same continuous pitch. Thereby, the internal gear 51 can be easily produced.

In such a speed reduction gear part 50, when the shaft 33 is rotated, the first sun gear 52 is rotated integrally with the shaft 33. The rotation of the first sun gear 52 is transmitted to the first-stage planetary gears 53 on an outer circumference side of the first sun gear 52. Each of the first-stage planetary gears 53 revolves around the outer circumferential portion of the first sun gear 52 while being meshed with the gear teeth 52g of the first sun gear 52 and the gear teeth 51g of the internal gear 51 of an outer circumference side and simultaneously rotates about the support shaft that is assembled to the first carrier 54. That is, the first-stage planetary gear 53 performs a so-called planetary motion.

According to the planetary motion of the plurality of first-stage planetary gears 53, the first carrier 54 is decelerated and rotated about the same axis as the shaft 33.

When the first carrier 54 is rotated, the second sun gear 55 is integrally rotated, and the rotation is transmitted to the second-stage planetary gears 56 of an outer circumference side of the second sun gear 55. Each of the second-stage planetary gears 56 revolves around the outer circumferential portion of the second sun gear 55 while being meshed with the gear teeth 55g of the second sun gear 55 and the gear teeth 51g of the internal gear 51 of an outer circumference side and simultaneously rotates about the support shaft that is assembled to the second carrier 57. That is, the second-stage planetary gear 56 performs a so-called planetary motion.

According to the planetary motion of the plurality of second-stage planetary gears 56, the second carrier 57 is decelerated and rotated about the same axis as the shaft 33.

One end 60a of the screw shaft 60 is held to freely rotate about the central axis of the screw shaft 60 by a bearing 61 that is provided in the first housing 10. The bearing 61 is held inside an annular bearing holder 62 that is fitted into and fixed in the first housing 10 by swaging or the like.

Figure 6:
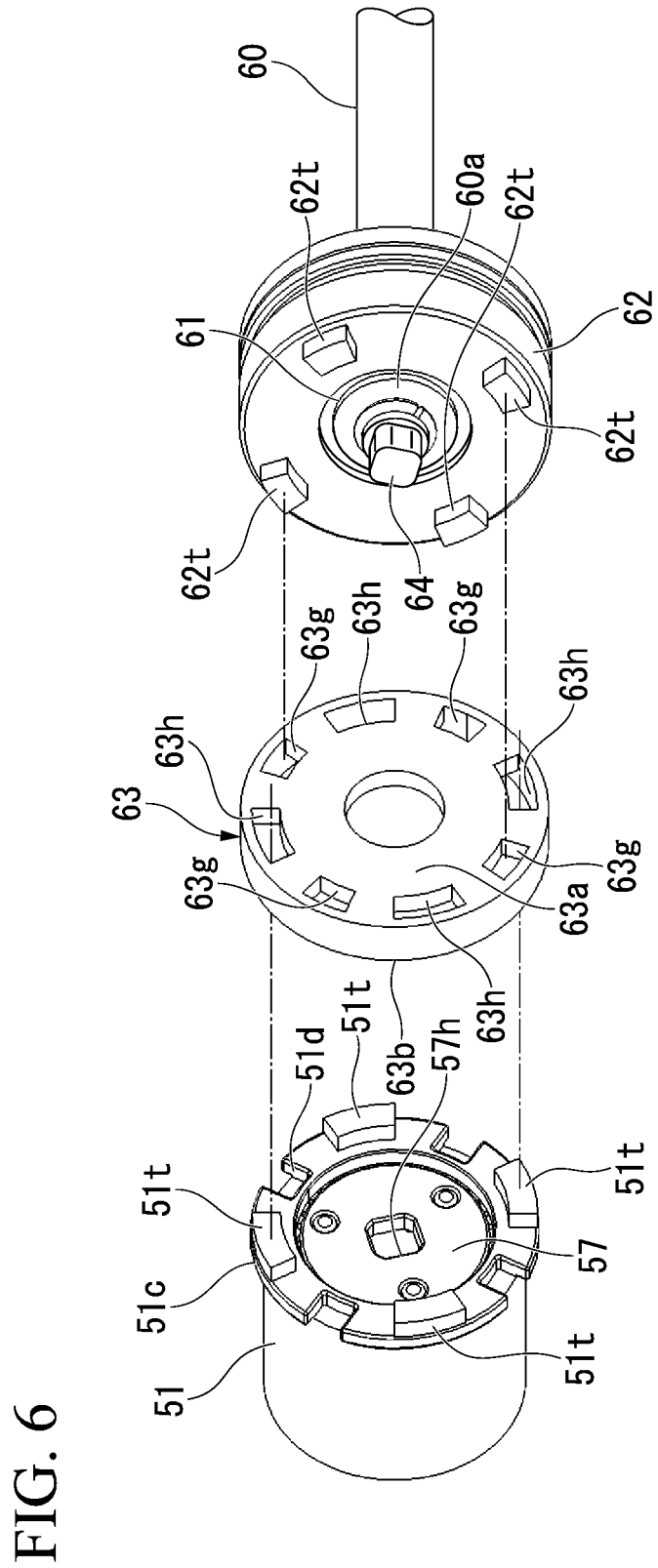
FIG. 6 is a perspective development view illustrating a damper member that is arranged between the internal gear and a bearing holder in the embodiment of the present invention.

FIG. 6 is a perspective development view illustrating a damper member 63 that is arranged between the internal gear 51 and the bearing holder 62.

As illustrated in FIG. 4 and FIG. 6, the damper member 63 is provided between the bearing 61 and the bearing holder 62 and the flange part 51c of the internal gear 51.

The damper member 63 is formed of a rubber material having elasticity and integrally has a discoid plate part 63a that is sandwiched between the bearing 61 and the bearing holder 62 and the flange part 51c of the internal gear 51, and a tubular part 63b which extends from an outer circumferential portion of the plate part 63a toward the internal gear 51 side and into which the flange part 51c of the internal gear 51 is inserted.

The tubular part 63b of the damper member 63 is interposed between the other end 31b of the yoke 31 and the flange part 51c of the internal gear 51 and the first housing 10 in the vicinity of the other end 31b of the yoke 31, and a clearance C1 is formed between the yoke 31 and the first housing 10. That is, the motor part 30 and the speed reduction gear part 50 are supported in a floating state on the first housing 10 by the end damper 38 and the damper member 63 that are provided at opposite ends of these parts in an axial direction.

In the bearing holder 62 that is fixed to the first housing 10, a plurality of protrusions 62t are formed on a side that faces the damper member 63 at intervals in a circumferential direction. In the flange part 51c of the internal gear 51, a plurality of protrusions 51t are formed at the side that faces the damper member 63 at intervals in the circumferential direction. A plurality of insertion holes 63h into which the protrusions 51t are inserted and a plurality of insertion holes 63g into which the protrusions 62t are inserted are formed on the damper member 63 at intervals in the circumferential direction. That is, the yoke 31 is prevented from rotating relative to the first housing 10 by the protrusion 51t that is formed on the internal gear 51 and the protrusion 62t that is formed on the bearing holder 62 which is fixed to the first housing 10. The protrusion 51t is inserted into the insertion hole 63h of the damper member 63, and the protrusion 62t is inserted into the insertion hole 63g of the damper member 63 to thereby prevent vibration of the motor part 30 and vibration of the speed reduction gear part 50 from being transmitted to the first housing 10.

A gear 64 that is meshed with an output gear hole 57h which is formed on the middle portion of the second carrier 57 of the speed reduction gear part 50 is provided on the one end 60a of the screw shaft 60. Thereby, the rotation of the shaft 33 in the motor part 30 is transmitted to the screw shaft 60 via the speed reduction gear part 50, and the screw shaft 60 is driven to rotate about the central axis of the screw shaft 60.

Figure 7:
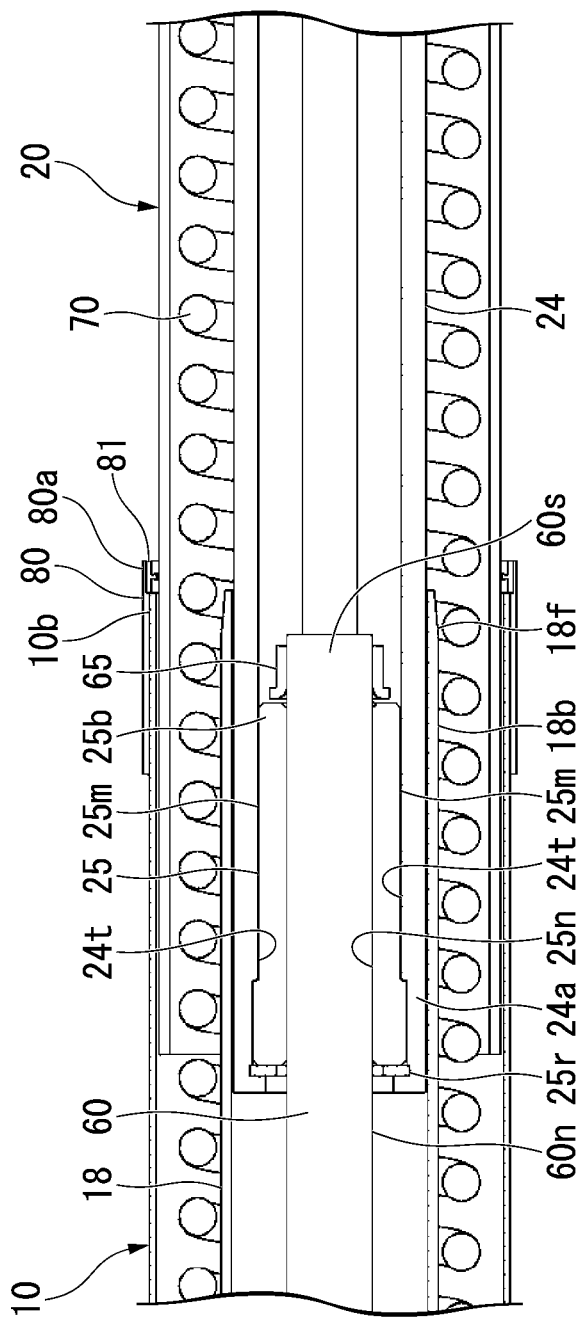
FIG. 7 is an enlarged cross-sectional view illustrating a joint part between a first housing and a second housing in the embodiment of the present invention.

FIG. 7 is an enlarged cross-sectional view illustrating a joint portion between the first housing 10 and the second housing 20.

As illustrated in the figure, a screw bar 60n that is continuous in a spiral shape is formed on an outer circumferential surface of the screw shaft 60. The other end 60b side of the screw shaft 60 is inserted into a nut member 25 that is provided inside one end 24a of the inner tube 24 of the second housing 20.

Figure 8:
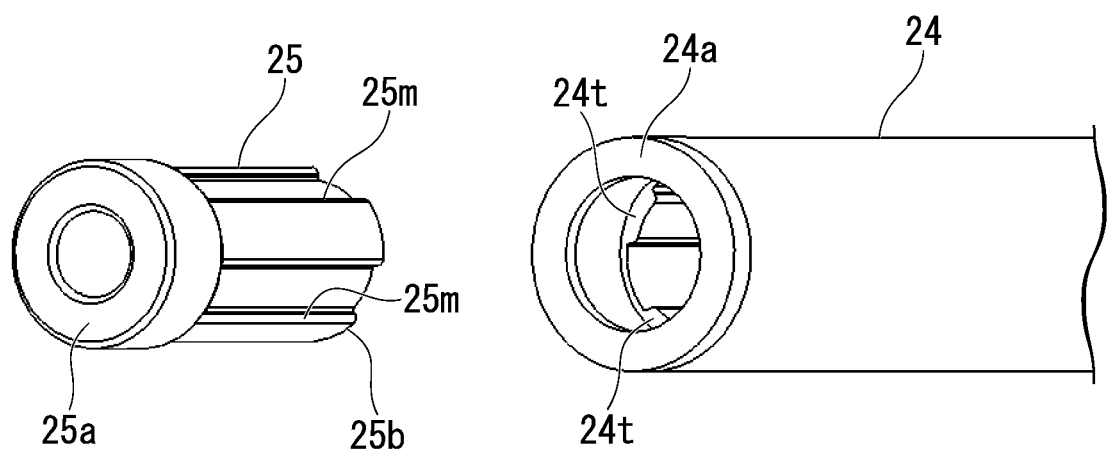
FIG. 8 is a perspective development view illustrating an inner tube and a nut member in the embodiment of the present invention.

FIG. 8 is a perspective development view illustrating the inner tube 24 and the nut member 25.

As illustrated in the figure, the nut member 25 has a plurality of grooves 25m (for example, four grooves in this embodiment) that are formed on an outer circumferential surface of the nut member 25 at intervals in a circumferential direction. On the other hand, a plurality of protrusions 24t (for example, four protrusions in this embodiment) that are continuous in an axial direction of the inner tube 24 are formed on an inner circumferential surface of the inner tube 24, into which the nut member 25 is inserted, at intervals in a circumferential direction.

The nut member 25 is arranged by meshing the groove 25m with the protrusion 24t of the inner tube 24. Thereby, rotation of the nut member 25 in the circumferential direction with respect to the inner tube 24 is restricted. Since the other end 24b of the inner tube 24 is screwed on the joint member 21 that is provided at the other end 20b of the second housing 20, relative rotation between the nut member 25 and the second housing 20 is restricted via the joint member 21 and the inner tube 24.

As illustrated in FIG. 7, the groove 25m of the nut member 25 is formed on the nut member 25 from an end 25b on the opposite side of the first housing 10 toward the first housing 10 at a predetermined length. Thereby, the groove 25m is not formed within a range of a certain length from an end 25a of the nut member 25 on the first housing 10 side. The protrusion 24t that is formed on the inner tube 24 is also not formed within a range of a predetermined length from the one end 24a of the inner tube 24.

In this way, the groove 25m is not formed over the entirety in an axial direction, and movement of the nut member 25 in a direction away from the first housing 10 is restricted by the meshing between the groove 25m of the nut member 25 and the protrusion 24t of the inner tube 24.

The end 25a of the nut member 25 is fixed in the inner tube 24 by a snap ring 25r or by swaging or the like.

In the screw shaft 60, the screw bar 60n is screwed on a female screw groove 25n that is formed on an inner circumferential surface of the nut member 25, and a tip 60s passes through and protrudes from the nut member 25.

A stopper 65 overhanging an outer circumference side is integrally fixed to the tip 60s of the screw shaft 60 by swaging or the like. The nut member 25 is prevented from coming out from the screw shaft 60 by the stopper 65.

As illustrated in FIG. 3, a coil spring 70 is arranged in the first housing 10 and the second housing 20. The coil spring 70 is made of, for example, a metal. The inner tube 24 is inserted inside the coil spring 70 in the second housing 20. A tubular guide tube 18 that is provided in the first housing 10 is inserted inside the coil spring 70 in the first housing 10.

As illustrated in FIG. 7, the guide tube 18 has a larger inner diameter than an outer diameter of the inner tube 24. The inner tube 24 is inserted into and arranged in the guide tube 18. An outer circumferential surface 18f on the other end 18b side of the guide tube 18 is formed in a tapered shape in which an outer diameter of the outer circumferential surface 18f is gradually decreased from one end 18a side toward the other end 18b side.

As illustrated in FIG. 4, a flange part 18c overhanging an outer circumference side is integrally formed close to the one end 18a of the guide tube 18. Further, an annular sealing member 66 is sandwiched between the flange part 18c of the guide tube 18 and the bearing holder 62. The sealing member 66 is formed of a material such as a rubber material having a waterproof property and elasticity, and an outer circumferential surface of the sealing member 66 is in close contact with the first housing 10.

The inner tube 24 and the guide tube 18 are inserted inside the coil spring 70, and thereby, when the coil spring 70 is expanded/shrunk, bending or buckling laterally in a direction of expansion/shrinkage of the coil spring 70 is prevented.

Such a coil spring 70 is provided in a compressed state between the plate part 21a of the joint member 21 of the second housing 20 and the flange part 18c of the guide tube 18. Thereby, the first housing 10 and the second housing 20 are separated from each other, and the coil spring 70 is biased in a direction in which a full length of the actuator 100 is increased.

The flange part 18c of the guide tube 18 is compressed to the sealing member 66 side by the coil spring 70. In other words, the sealing member 66 is sandwiched by the flange part 18c of the guide tube 18 and the bearing holder 62.

As illustrated in FIG. 7, a cylindrical outer ring 80 is provided on an outer circumference side of the other end 10b of the first housing 10. The outer ring 80 is formed of a material such as a metal having high rigidity and is press-fitted around and fixed to the other end 10b of the first housing 10.

A tip 80a of the outer ring 80 slightly protrudes from the other end 10b of the first housing 10 toward the second housing 20 side. An annular seal ring 81 that is formed of a rubber material having waterproof properties and elasticity in an annular shape is integrally provided on an inner circumferential surface of the tip 80a of the outer ring 80.

In this way, the outer ring 80 and the seal ring 81 that are made of a different material may be formed by, for example, two-color molding.

An inner circumferential surface of the seal ring 81 is in sliding contact with an outer circumferential surface of the second housing 20. Water or the like is prevented from penetrating into the actuator 100 from a gap between the first housing 10 and the second housing 20 by the seal ring 81.

(Operation of Vehicle-Door Opening/Closing Actuator)

Next, an operation of the actuator 100 will be described.

When the shaft 33 of the motor part 30 is driven to rotate, the rotation of the shaft 33 is transmitted to the screw shaft 60 via the speed reduction gear part 50. Thereby, when the screw shaft 60 is rotated, the nut member 25 moves in an axial direction of the screw shaft 60. Since the nut member 25 is fixed to the inner tube 24 that is integrated with the second housing 20, the second housing 20 is projected/retracted with respect to the first housing 10, and the actuator 100 is expanded/shrunk.

At this time, the first housing 10 is formed of a metal material such as iron whereas the second housing 20 is formed of a soft material such as a resin. Therefore, a slide mark does not occur on the first housing 10 and occurs only on the second housing 20. Furthermore, the second housing 20 is formed of a resin or the like. Thereby, the slide mark is inconspicuous, and design characteristics are maintained.

Figure 9:
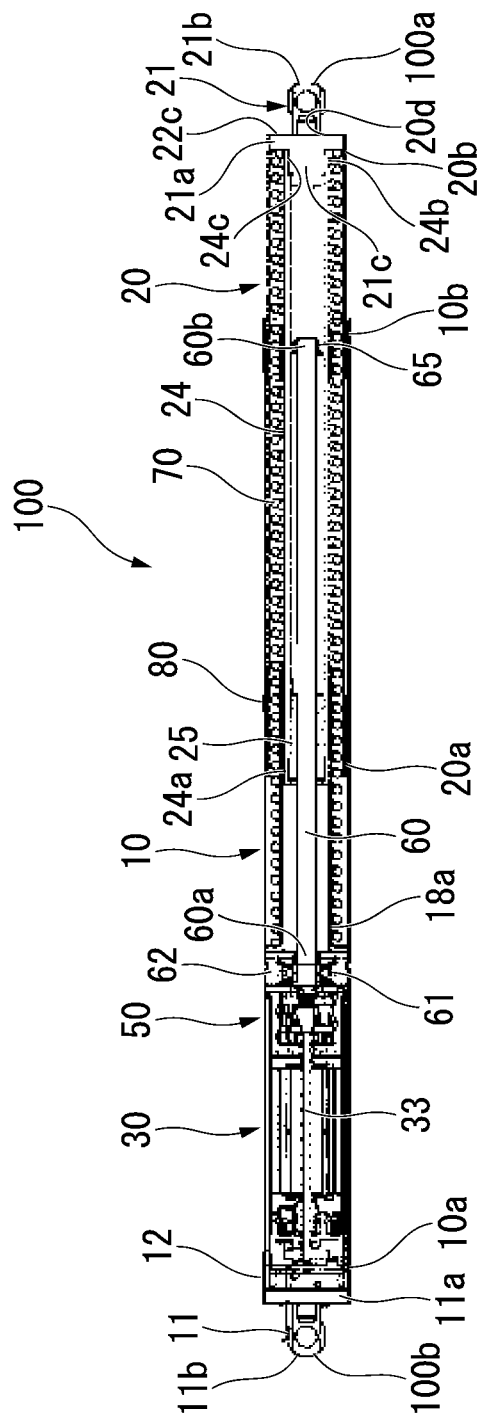
FIG. 9 is a cross-sectional view illustrating a state in which the vehicle-door opening/closing actuator is shrunk in the embodiment of the present invention.

FIG. 9 is a cross-sectional view illustrating a state in which the actuator 100 is shrunk.

As illustrated in the figure, when the second housing 20 is retracted with respect to the first housing 10, the back gate 2 that is provided on the opening 3 of the automobile 1 is closed. On the other hand, as illustrated in FIG. 3, when the second housing 20 is projected with respect to the first housing 10, the back gate 2 that is provided on the opening 3 of the automobile 1 is opened. At this time, even when an operation of the motor part 30 is stopped in a state where the actuator 100 is expanded, a state in which the second housing 20 is projected with respect to the first housing 10 is maintained by a biasing force of the coil spring 70.

In the embodiment described above, the end damper 38 is provided on the holder member 37 that is provided on the one end 31a side of the yoke 31, and the damper member 38 is provided on the internal gear 51 that is provided on the other end 31b side of the yoke 31. Thereby, the clearance C1 is formed between the yoke 31 and the first housing 10. That is, the motor part 30, the power supplying part 35, and the speed reduction gear part 50 are supported in a floating state on the first housing 10 via the end damper 38 and the damper member 38. Therefore, it is possible to prevent vibration of the motor part 30 and the speed reduction gear part 50 and vibration between the motor part 30 and the speed reduction gear part 50 and the screw shaft 60 from being transmitted to the first housing 10. Therefore, it is possible to reduce vibration and noise while the actuator 100 is operated.

The protrusion 51t that protrudes toward the damper member 63 is formed on the internal gear 51, the protrusion 62t that protrudes toward the damper member 63 is formed on the bearing holder 62, and the insertion hole 63h into which the protrusion 51t can be inserted and the insertion hole 63g into which the protrusion 62t can be inserted are formed on the damper member 63. Therefore, it is possible to absorb a relative displacement in a circumferential direction between the internal gear 51 side and the bearing holder 62 side by the damper member 63. Thereby, it is possible to prevent vibration and impact in a rotation direction while the motor 30 is operated from occurring. Further, it is possible to prevent vibration and impact when the screw shaft 60 is rotated by an external force from being input to the motor 30 and the speed reduction gear part 50 side.

Further, the internal gear 51 of the speed reduction gear part 50 is provided on an inner circumferential surface 31g of the yoke 31 of the motor part 30. Therefore, it is possible to determine the relative position between the yoke 31 and the internal gear 51 easily and with high accuracy.

Furthermore, the bearing 38B that supports the shaft 33 of the motor part 30 such that the shaft 33 is rotatable is provided on the internal gear 51. Therefore, it is possible to align the central axis of the motor part 30 with the central axis of the speed reduction gear part 50 easily and with high accuracy. Further, it is possible to prevent excess stress from being applied on a component which degrades the durability, and it is possible to prevent problems such as an increase of the operation sound due to components strongly hitting each other. Accordingly, it is possible to enhance the durability, the operation property, and the like of the actuator 100, and it is possible to reduce vibration and the operation sound to improve the quality of the actuator 100.

Further, the bearing 38B that supports the shaft 33 of the motor part 30 such that the shaft 33 is rotatable is provided on the internal gear 51, and thereby, it becomes unnecessary to apply a drawing process and the like for supporting the bearing 38B on the yoke 31. Therefore, it is possible to reduce a process cost of the yoke 31.

Further, the speed reduction gear part 50 is constituted of a planetary speed reduction mechanism, and thereby, a space can be saved while increasing a speed reduction ratio of the speed reduction gear part 50.

The planetary speed reduction mechanism constituting the speed reduction gear part 50 has a multi-stage configuration, and the gear teeth 51g that is formed on the inner circumferential surface of the internal gear 51 are formed at the same pitch to be meshed with each of the first-stage planetary gears 53 and the second-stage planetary gears 56. Thereby, the internal gear 51 can be easily manufactured.

The internal gear 51 is fixed to the inner circumferential surface 31g of the yoke 31 by swaging. Therefore, the internal gear 51 can be reliably positioned and fixed with respect to the yoke 31. Further, when the motor part 30 is rotated, the internal gear 51 can be prevented from rotating due to a reaction force of the motor part 30.

The guide tube 18 is provided in the first housing 10, and the sealing member 66 is sandwiched by the flange part 18c of the guide tube 18 and the bearing holder 62. Therefore, the flange part 18c and the bearing holder 62 are in close contact with the sealing member 66, and a sealing property between the flange part 18c and the bearing holder 62 is secured. As a result, for example, even when water and dust penetrate from the gap between the first housing 10 and the second housing 20, the water and the dust can be prevented from penetrating into the motor part 30 by the sealing member 66. Accordingly, the durability of the actuator 100 can be improved, and reliability of the operation can be enhanced.

Furthermore, the coil spring 70 is provided between the first housing 10 and the guide tube 18, and the flange part 18c is pressed against the sealing member 66 side using a spring force of the coil spring 70. Therefore, it is possible to enhance a close contact property of the flange part 18c and the bearing holder 62 with respect to the sealing member 66.

It is possible to prevent buckling of the coil spring 70 in a direction intersecting with a compression direction of the coil spring 70 during compression by the guide tube 18. A pressing force of the coil spring 70 is transmitted to the sealing member 66 via the flange part 18c, and therefore, the pressing force of the coil spring 70 uniformly acts on the sealing member 66. Therefore, it is possible to further enhance the close contact property of the flange part 18c and the bearing holder 62 with respect to the sealing member 66.

The sealing member 66 is provided so as to be in close contact with the bearing holder 62, and the guide tube 18 is used to enhance the waterproof property and dust resistance of the motor part 30 side, and by providing the guide tube 18, there is no need to provide a step surface at a position corresponding to the bearing holder 62 of the first housing 10 and to bring the bearing holder 62 and the sealing member 66 into close contact with each other. That is, there is no need to apply a deep drawing process on a place corresponding to the guide tube 18 of the first housing 10 in accordance with the shape of the guide tube 18 and to form a step surface (an inner wall) abutting the sealing member 66 on the first housing 10. Therefore, it is possible to form the first housing 10 in a tubular shape, and it is possible to reduce processing costs of the first housing 10.

The first housing 10 can be formed in a tubular shape, and therefore, when the actuator 100 is assembled, after the motor part 30, the speed reduction gear part 50, and the bearing holder 62 are assembled to the first housing 10, the sealing member 66, the guide tube 18, and the coil spring 70 have only to be inserted from the other end 10b side of the first housing 10 in that order. Therefore, it is also possible to improve the assemble property of the actuator 100.

The inner tube 24 is provided in the second housing 20, and thereby, the inner tube 24 is arranged on the other end 18b side of the guide tube 18. Therefore, the full length of the coil spring 70 can be guided by the two tubes 18 and 24 of the guide tube 18 and the inner tube 24.

Buckling of the coil spring 70 in the direction intersecting the compression direction of the coil spring 70 during the compression can be prevented by the inner tube 24. Therefore, the pressing force of the coil spring 70 further uniformly acts on the sealing member 66. As a result, a close contact property of the flange part 18c and the bearing holder 62 with respect to the sealing member 66 can be further enhanced.

The inner tube 24 holds the nut member 25, and thereby, there is no need to provide another component or the like in order to hold the nut member 25, and the number of components can be reduced.

The actuator 100 further includes the tubular outer ring 80 that is provided on the end of the first housing 10 and the annular seal ring 81 that is provided on the inner circumferential surface of the outer ring 80 and is in sliding contact with the outer circumferential surface of the second housing 20. Thereby, penetrating substances (rainwater, dust, and the like) can be prevented from penetrating from the gap between the first housing 10 and the second housing 20.

Other Embodiments

The present invention is not limited to the above embodiment and includes embodiments which are variously changed from the above embodiment without departing from the scope of the present invention.

For example, the configuration of each part of the actuator 100 can be appropriately changed without departing from the scope of the present invention. As an example, in the above embodiment, the case in which the speed reduction gear part 50 is constituted of the planetary speed reduction mechanism has been described. However, without being limited thereto, various speed reduction mechanisms can be applied in place of the planetary speed reduction mechanism. In this case, the gear case of the speed reduction mechanism may be arranged on the inner circumferential surface of the yoke 31 of the motor part 30, and the bearing 38B for rotatably supporting the shaft 33 may be provided on the gear case.

In the above embodiment, the case in which the four grooves 25m are formed on the outer circumferential surface of the nut member 25, the four protrusions 24t are formed on the inner circumferential surface of the inner tube 24, and thereby the rotation of the nut member 25 with respect to the inner tube 24 in the circumferential direction is restricted has been described. However, without being limited thereto, at least one groove 25m may be formed on the outer circumferential surface of the nut member 25, and at least one protrusion 24t corresponding to the one groove 25m may be formed on the inner circumferential surface of the inner tube 24. Further, a protrusion may be formed on the outer circumferential surface of the nut member 25, whereas a groove that can be engaged with the protrusion may be formed on the inner circumferential surface of the inner tube 24.

In the above embodiment, the case in which the tubular guide tube 18 is inserted into the tubular first housing 10 and the sealing member 66 is sandwiched by the flange part 18c of the guide tube 18 and the bearing holder 62 has been described. However, without being limited thereto, a place corresponding to the guide tube 18 of the first housing 10 may be formed to correspond to the shape of the guide tube 18 by a deep drawing process or the like, and the sealing member 66 may be constituted so as to be sandwiched by the step surface formed thereby and the bearing holder 62. In this case, the coil spring 70 is arranged on an outer circumferential surface of the first housing 10 on which the deep drawing process or the like is applied.

In the above embodiment, the case in which the rotational force of the shaft 33 of the motor part 30 is transmitted to the screw shaft 60 via the speed reduction gear part 50 has been described. However, without being limited thereto, the screw shaft 60 may be directly coupled to the shaft 33. In this case, the screw shaft 60 may be rotatably supported by the bearing 61 that is provided on the bearing holder 62, or the shaft 33 may be rotatably supported.

In the above embodiment, the case in which the end damper 38 is provided on the holder member 37 that is provided close to the one end 31a of the yoke 31 and the damper member 38 is provided on the internal gear 51 that is provided close to the other end 31b of the yoke 31 has been described. The case in which the motor part 30, the power supplying part 35, and the speed reduction gear part 50 are supported in a floating state by the first housing 10 via the end damper 38 and the damper member 38 has been described. However, without being limited thereto, the end damper 38 or the damper member 38 may be interposed between the first housing 10 and the yoke 31 and at least in the vicinity of both ends of the motor part 30. According to such a configuration, it is possible to prevent the vibration at least during the operation of the motor part 30 from being transmitted to the first housing 10.

Further, use of the actuator 100 is not limited to use of the opening/closing of the back gate 2, and the actuator 100 can be used for opening/closing of other various doors.

In addition to the foregoing, the configuration described in the above embodiment can be adopted or rejected as long as it does not depart from the scope of the present invention or can be adequately changed to another configuration.

INDUSTRIAL APPLICABILITY

According to the actuator and the vehicle-door opening/closing actuator described above, it is possible to prevent vibration of the motor from being transmitted to the first housing. Therefore, it is possible to reduce vibration and noise while the actuator is operated.

DESCRIPTION OF THE REFERENCE SYMBOLS

1 Automobile (attached body)
2 Tailgate (door, attached body)
3 Opening (attached body)
A Actuator
10 First housing
18 Guide tube
18c Flange part
20 Second housing
24 Inner tube
25 Nut member (driven member)
30 Motor part (motor)
31 Yoke
31e Protrusion
31f Inner circumferential surface
33 Shaft (rotary shaft)
38 End damper (first damper member)
38A, 38B Bearing
50 Speed reduction gear part
51 Internal gear
51d Slit
51g Gear tooth
51t Protrusion (first protrusion)
52 First sun gear
53 First-stage planetary gear
54 First carrier
55 Second sun gear
56 Second-stage planetary gear
57 Second carrier
60 Screw shaft (drive shaft)
61 Bearing
62 Bearing holder
62t Protrusion (second protrusion)
63 Damper member (second damper member)
63g, 63h Insertion hole (insertion part)
66 Sealing member
70 Coil spring
80 Outer ring
81 Seal ring
130 Armature

The invention claimed is:

1. An actuator comprising
a tubular first housing that is configured to be attached to a body,
a motor that is provided in the first housing and that has a yoke to which a magnet is attached,
a first damper member that is provided on one end of the yoke in an axial direction of the yoke and absorbs vibration, and a second damper member that is provided on another end of the yoke in the axial direction of the yoke and absorbs vibration,
a drive shaft that is rotated by a rotary shaft of the motor, and
a speed reduction gear part that is provided between the rotary shaft of the motor and the drive shaft, that is housed in the yoke, that has an internal gear, and that rotates the drive shaft at a rotational speed which is less than a rotational speed of the rotary shaft,
wherein the motor is supported in a floating state in the first housing via the first damper member and the second damper member,
the internal gear comprises
a plate that has a disc shape,
a tubular part that has a tubular shape having first and second ends and that extends from an outer circumferential portion of the plate toward the another end of the yoke, and
a flange disposed on and extending radially outwardly from the second end of the tubular part and having a diameter which is larger than a diameter of the tubular part, and
the flange is disposed between the yoke and a portion of the second damper member.

2. The actuator according to claim 1, further comprising
a tubular second housing that is provided so as to be capable of being projected or retracted with respect to the first housing,
a driven member that is fixed to the second housing and that is moved along the axial direction of the yoke in accordance with a rotation of the drive shaft to thereby cause the second housing to be projected or retracted with respect to the first housing, and
a coil spring that is provided in the first housing and the second housing and that provides a bias force that urges the second housing away from the first housing.

3. The actuator according to claim 2, further comprising
a bearing holder that is provided in the first housing and that holds a bearing which rotatably supports the drive shaft,
wherein the second damper member is provided between the speed reduction gear part and the bearing holder.

4. The actuator according to claim 3,
wherein a first protrusion that protrudes toward the second damper member is formed on the tubular part of the internal gear case,
a second protrusion that protrudes toward the second damper member is formed on the bearing holder, and
an insertion hole in which the first protrusion and the second protrusion are capable of being inserted is formed in the second damper member.

5. A vehicle-door wherein the actuator according to claim 2 is used to move the door between opened and closed positions with respect to an opening in a vehicle body,
wherein the first housing is coupled to one of the vehicle body and the door, and
the second housing is coupled to the other of the vehicle body and the door.

* * * * *